United States Patent
La Fratta et al.

(10) Patent No.: US 11,288,214 B2
(45) Date of Patent: *Mar. 29, 2022

(54) COMMAND SELECTION POLICY

(71) Applicant: Micron Technology, Inc., Boise, ID (US)

(72) Inventors: Patrick A. La Fratta, McKinney, TX (US); Robert M. Walker, Raleigh, NC (US)

(73) Assignee: Micron Technology, Inc., Boise, ID (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/093,104

(22) Filed: Nov. 9, 2020

(65) Prior Publication Data

US 2021/0056052 A1 Feb. 25, 2021

Related U.S. Application Data

(63) Continuation of application No. 16/103,585, filed on Aug. 14, 2018, now Pat. No. 10,831,682, which is a
(Continued)

(51) Int. Cl.
*G06F 12/00* (2006.01)
*G06F 13/16* (2006.01)
(Continued)

(52) U.S. Cl.
CPC ........ *G06F 13/1642* (2013.01); *G06F 3/0607* (2013.01); *G06F 3/0659* (2013.01);
(Continued)

(58) Field of Classification Search
CPC .......................... G06F 13/1626; G06F 13/1642
See application file for complete search history.

(56) References Cited

U.S. PATENT DOCUMENTS 4,380,046 A 4/1983 Fung
4,435,792 A 3/1984 Bechtolsheim
(Continued)

FOREIGN PATENT DOCUMENTS

CN 102141905 8/2011
EP 0214718 3/1987
(Continued)

OTHER PUBLICATIONS

"4.9.3 MINLOC and MAXLOC", Jun. 12, 1995, (5pgs.), Message Passing Interface Forum 1.1, retrieved from http://www.mpi-forum.org/docs/mpi-1.1/mpi-11-html/node79.html.
(Continued)

*Primary Examiner* — Daniel D Tsui
(74) *Attorney, Agent, or Firm* — Brooks, Cameron & Huebsch, PLLC

(57) ABSTRACT

Apparatuses and methods related to command selection policy for electronic memory or storage are described. Commands to a memory controller may be prioritized based on a type of command, a timing of when one command was received relative to another command, a timing of when one command is ready to be issued to a memory device, or some combination of such factors. For instance, a memory controller may employ a first-ready, first-come, first-served (FRFCFS) policy in which certain types of commands (e.g., read commands) are prioritized over other types of commands (e.g., write commands). The policy may employ exceptions to such an FRFCFS policy based on dependencies or relationships among or between commands. An example can include inserting a command into a priority queue based on a category corresponding to respective commands, and iterating through a plurality of priority queues in order of priority to select a command to issue.

20 Claims, 5 Drawing Sheets

Related U.S. Application Data continuation of application No. 15/791,886, filed on Oct. 24, 2017, now Pat. No. 10,409,739.

(51) Int. Cl.
  *G06F 3/06* (2006.01)
  *G06F 12/06* (2006.01)

(52) U.S. Cl.
  CPC ........ *G06F 3/0685* (2013.01); *G06F 12/0638* (2013.01); *G06F 2212/205* (2013.01)

(56) References Cited

U.S. PATENT DOCUMENTS

| | | |
|---|---|---|
| 4,435,793 A | 3/1984 | Ochii |
| 4,727,474 A | 2/1988 | Batcher |
| 4,843,264 A | 6/1989 | Galbraith |
| 4,958,378 A | 9/1990 | Bell |
| 4,977,542 A | 12/1990 | Matsuda et al. |
| 5,023,838 A | 6/1991 | Herbert |
| 5,034,636 A | 7/1991 | Reis et al. |
| 5,201,039 A | 4/1993 | Sakamura |
| 5,210,850 A | 5/1993 | Kelly et al. |
| 5,253,308 A | 10/1993 | Johnson |
| 5,276,643 A | 1/1994 | Hoffmann et al. |
| 5,325,519 A | 6/1994 | Long et al. |
| 5,367,488 A | 11/1994 | An |
| 5,379,257 A | 1/1995 | Matsumura et al. |
| 5,386,379 A | 1/1995 | Ail-Yahia et al. |
| 5,398,213 A | 3/1995 | Yeon et al. |
| 5,440,482 A | 8/1995 | Davis |
| 5,446,690 A | 8/1995 | Tanaka et al. |
| 5,473,576 A | 12/1995 | Matsui |
| 5,481,500 A | 1/1996 | Reohr et al. |
| 5,485,373 A | 1/1996 | Davis et al. |
| 5,506,811 A | 4/1996 | McLaury |
| 5,615,404 A | 3/1997 | Knoll et al. |
| 5,638,128 A | 6/1997 | Hoogenboom |
| 5,638,317 A | 6/1997 | Tran |
| 5,654,936 A | 8/1997 | Cho |
| 5,678,021 A | 10/1997 | Pawate et al. |
| 5,724,291 A | 3/1998 | Matano |
| 5,724,366 A | 3/1998 | Furutani |
| 5,751,987 A | 5/1998 | Mahant-Shetti et al. |
| 5,787,458 A | 7/1998 | Miwa |
| 5,854,636 A | 12/1998 | Watanabe et al. |
| 5,867,429 A | 2/1999 | Chen et al. |
| 5,870,504 A | 2/1999 | Nemoto et al. |
| 5,915,084 A | 6/1999 | Wendell |
| 5,935,263 A | 8/1999 | Keeth et al. |
| 5,986,942 A | 11/1999 | Sugibayashi |
| 5,991,209 A | 11/1999 | Chow |
| 5,991,785 A | 11/1999 | Alidina et al. |
| 6,005,799 A | 12/1999 | Rao |
| 6,009,020 A | 12/1999 | Nagata |
| 6,088,772 A | 7/2000 | Harriman et al. |
| 6,092,186 A | 7/2000 | Betker et al. |
| 6,122,211 A | 9/2000 | Morgan et al. |
| 6,125,071 A | 9/2000 | Kohno et al. |
| 6,134,164 A | 10/2000 | Lattimore et al. |
| 6,147,514 A | 11/2000 | Shiratake |
| 6,151,244 A | 11/2000 | Fujino et al. |
| 6,157,578 A | 12/2000 | Brady |
| 6,163,862 A | 12/2000 | Adams et al. |
| 6,166,942 A | 12/2000 | Vo et al. |
| 6,172,918 B1 | 1/2001 | Hidaka |
| 6,175,514 B1 | 1/2001 | Henderson |
| 6,181,698 B1 | 1/2001 | Hariguchi |
| 6,208,544 B1 | 3/2001 | Beadle et al. |
| 6,226,215 B1 | 5/2001 | Yoon |
| 6,301,153 B1 | 10/2001 | Takeuchi et al. |
| 6,301,164 B1 | 10/2001 | Manning et al. |
| 6,304,477 B1 | 10/2001 | Naji |
| 6,389,507 B1 | 5/2002 | Sherman |
| 6,418,498 B1 | 7/2002 | Martwick |
| 6,466,499 B1 | 10/2002 | Blodgett |
| 6,510,098 B1 | 1/2003 | Taylor |
| 6,563,754 B1 | 5/2003 | Lien et al. |
| 6,578,058 B1 | 6/2003 | Nygaard |
| 6,731,542 B1 | 5/2004 | Le et al. |
| 6,754,746 B1 | 6/2004 | Leung et al. |
| 6,768,679 B1 | 7/2004 | Le et al. |
| 6,807,614 B2 | 10/2004 | Chung |
| 6,816,422 B2 | 11/2004 | Hamade et al. |
| 6,819,612 B1 | 11/2004 | Achter |
| 6,894,549 B2 | 5/2005 | Eliason |
| 6,943,579 B1 | 9/2005 | Hazanchuk et al. |
| 6,948,056 B1 | 9/2005 | Roth et al. |
| 6,950,771 B1 | 9/2005 | Fan et al. |
| 6,950,898 B2 | 9/2005 | Merritt et al. |
| 6,956,770 B2 | 10/2005 | Khalid et al. |
| 6,961,272 B2 | 11/2005 | Schreck |
| 6,965,648 B1 | 11/2005 | Smith et al. |
| 6,985,394 B2 | 1/2006 | Kim |
| 6,987,693 B2 | 1/2006 | Cernea et al. |
| 7,020,017 B2 | 3/2006 | Chen et al. |
| 7,028,170 B2 | 4/2006 | Saulsbury |
| 7,045,834 B2 | 5/2006 | Tran et al. |
| 7,054,178 B1 | 5/2006 | Shiah et al. |
| 7,061,817 B2 | 6/2006 | Raad et al. |
| 7,079,407 B1 | 7/2006 | Dimitrelis |
| 7,173,857 B2 | 2/2007 | Kato et al. |
| 7,187,585 B2 | 3/2007 | Li et al. |
| 7,196,928 B2 | 3/2007 | Chen |
| 7,260,565 B2 | 8/2007 | Lee et al. |
| 7,260,672 B2 | 8/2007 | Garney |
| 7,372,715 B2 | 5/2008 | Han |
| 7,400,532 B2 | 7/2008 | Aritome |
| 7,406,494 B2 | 7/2008 | Magee |
| 7,447,720 B2 | 11/2008 | Beaumont |
| 7,454,451 B2 | 11/2008 | Beaumont |
| 7,457,181 B2 | 11/2008 | Lee et al. |
| 7,535,769 B2 | 5/2009 | Cernea |
| 7,546,438 B2 | 6/2009 | Chung |
| 7,562,198 B2 | 7/2009 | Noda et al. |
| 7,574,466 B2 | 8/2009 | Beaumont |
| 7,602,647 B2 | 10/2009 | Li et al. |
| 7,663,928 B2 | 2/2010 | Tsai et al. |
| 7,685,365 B2 | 3/2010 | Rajwar et al. |
| 7,692,466 B2 | 4/2010 | Ahmadi |
| 7,752,417 B2 | 7/2010 | Manczak et al. |
| 7,791,962 B2 | 9/2010 | Noda et al. |
| 7,796,453 B2 | 9/2010 | Riho et al. |
| 7,805,587 B1 | 9/2010 | Van Dyke et al. |
| 7,808,854 B2 | 10/2010 | Takase |
| 7,827,372 B2 | 11/2010 | Bink et al. |
| 7,869,273 B2 | 1/2011 | Lee et al. |
| 7,898,864 B2 | 3/2011 | Dong |
| 7,924,628 B2 | 4/2011 | Danon et al. |
| 7,937,535 B2 | 5/2011 | Ozer et al. |
| 7,957,206 B2 | 6/2011 | Bauser |
| 7,979,667 B2 | 7/2011 | Allen et al. |
| 7,996,749 B2 | 8/2011 | Ding et al. |
| 8,042,082 B2 | 10/2011 | Solomon |
| 8,045,391 B2 | 10/2011 | Mokhlesi |
| 8,059,438 B2 | 11/2011 | Chang et al. |
| 8,095,825 B2 | 1/2012 | Hirotsu et al. |
| 8,117,462 B2 | 2/2012 | Snapp et al. |
| 8,164,942 B2 | 4/2012 | Gebara et al. |
| 8,208,328 B2 | 6/2012 | Hong |
| 8,213,248 B2 | 7/2012 | Moon et al. |
| 8,223,568 B2 | 7/2012 | Seo |
| 8,238,173 B2 | 8/2012 | Akerib et al. |
| 8,274,841 B2 | 9/2012 | Shimano et al. |
| 8,279,683 B2 | 10/2012 | Klein |
| 8,310,884 B2 | 11/2012 | Iwai et al. |
| 8,332,367 B2 | 12/2012 | Bhattacherjee et al. |
| 8,339,824 B2 | 12/2012 | Cooke |
| 8,339,883 B2 | 12/2012 | Yu et al. |
| 8,347,154 B2 | 1/2013 | Bahali et al. |
| 8,351,292 B2 | 1/2013 | Matano |
| 8,356,144 B2 | 1/2013 | Hessel et al. |
| 8,417,921 B2 | 4/2013 | Gonion et al. |
| 8,462,532 B1 | 6/2013 | Argyres |

(56) References Cited

U.S. PATENT DOCUMENTS

| | | |
|---|---|---|
| 8,484,276 B2 | 7/2013 | Carlson et al. |
| 8,495,438 B2 | 7/2013 | Roine |
| 8,503,250 B2 | 8/2013 | Demone |
| 8,526,239 B2 | 9/2013 | Kim |
| 8,533,245 B1 | 9/2013 | Cheung |
| 8,555,037 B2 | 10/2013 | Gonion |
| 8,599,613 B2 | 12/2013 | Abiko et al. |
| 8,605,015 B2 | 12/2013 | Guttag et al. |
| 8,625,376 B2 | 1/2014 | Jung et al. |
| 8,644,101 B2 | 2/2014 | Jun et al. |
| 8,650,232 B2 | 2/2014 | Stortz et al. |
| 8,873,272 B2 | 10/2014 | Lee |
| 8,964,496 B2 | 2/2015 | Manning |
| 8,971,124 B1 | 3/2015 | Manning |
| 9,015,390 B2 | 4/2015 | Klein |
| 9,047,193 B2 | 6/2015 | Lin et al. |
| 9,165,023 B2 | 10/2015 | Moskovich et al. |
| 9,659,605 B1 | 5/2017 | Zawodny et al. |
| 9,659,610 B1 | 5/2017 | Hush |
| 9,697,876 B1 | 7/2017 | Tiwari et al. |
| 9,761,300 B1 | 9/2017 | Willcock |
| 10,409,839 B2 | 9/2019 | Boggio et al. |
| 2001/0007112 A1 | 7/2001 | Porterfield |
| 2001/0008492 A1 | 7/2001 | Higashiho |
| 2001/0010057 A1 | 7/2001 | Yamada |
| 2001/0028584 A1 | 10/2001 | Nakayama et al. |
| 2001/0043089 A1 | 11/2001 | Forbes et al. |
| 2002/0059355 A1 | 5/2002 | Peleg et al. |
| 2003/0167426 A1 | 9/2003 | Slobodnik |
| 2003/0222879 A1 | 12/2003 | Lin et al. |
| 2004/0073592 A1 | 4/2004 | Kim et al. |
| 2004/0073773 A1 | 4/2004 | Demjanenko |
| 2004/0085840 A1 | 5/2004 | Vali et al. |
| 2004/0095826 A1 | 5/2004 | Perner |
| 2004/0154002 A1 | 8/2004 | Ball et al. |
| 2004/0205289 A1 | 10/2004 | Srinivasan |
| 2004/0240251 A1 | 12/2004 | Nozawa et al. |
| 2005/0015557 A1 | 1/2005 | Wang et al. |
| 2005/0078514 A1 | 4/2005 | Scheuerlein et al. |
| 2005/0097417 A1 | 5/2005 | Agrawal et al. |
| 2006/0047937 A1 | 3/2006 | Selvaggi et al. |
| 2006/0069849 A1 | 3/2006 | Rudelic |
| 2006/0112240 A1 | 5/2006 | Walker et al. |
| 2006/0146623 A1 | 7/2006 | Mizuno et al. |
| 2006/0149804 A1 | 7/2006 | Luick et al. |
| 2006/0181917 A1 | 8/2006 | Kang et al. |
| 2006/0215432 A1 | 9/2006 | Wickeraad et al. |
| 2006/0225072 A1 | 10/2006 | Lari et al. |
| 2006/0291282 A1 | 12/2006 | Liu et al. |
| 2007/0103986 A1 | 5/2007 | Chen |
| 2007/0171747 A1 | 7/2007 | Hunter et al. |
| 2007/0180006 A1 | 8/2007 | Gyoten et al. |
| 2007/0180184 A1 | 8/2007 | Sakashita et al. |
| 2007/0195602 A1 | 8/2007 | Fong et al. |
| 2007/0285131 A1 | 12/2007 | Sohn |
| 2007/0285979 A1 | 12/2007 | Turner |
| 2007/0291532 A1 | 12/2007 | Tsuji |
| 2008/0025073 A1 | 1/2008 | Arsovski |
| 2008/0037333 A1 | 2/2008 | Kim et al. |
| 2008/0052711 A1 | 2/2008 | Forin et al. |
| 2008/0137388 A1 | 6/2008 | Krishnan et al. |
| 2008/0165601 A1 | 7/2008 | Matick et al. |
| 2008/0178053 A1 | 7/2008 | Gorman et al. |
| 2008/0215937 A1 | 9/2008 | Dreibelbis et al. |
| 2009/0067218 A1 | 3/2009 | Graber |
| 2009/0154238 A1 | 6/2009 | Lee |
| 2009/0154273 A1 | 6/2009 | Borot et al. |
| 2009/0254697 A1 | 10/2009 | Akerib |
| 2010/0067296 A1 | 3/2010 | Li |
| 2010/0091582 A1 | 4/2010 | Vali et al. |
| 2010/0172190 A1 | 7/2010 | Lavi et al. |
| 2010/0210076 A1 | 8/2010 | Gruber et al. |
| 2010/0226183 A1 | 9/2010 | Kim |
| 2010/0308858 A1 | 12/2010 | Noda et al. |
| 2010/0332895 A1 | 12/2010 | Billing et al. |
| 2011/0051523 A1 | 3/2011 | Manabe et al. |
| 2011/0063919 A1 | 3/2011 | Chandrasekhar et al. |
| 2011/0093662 A1 | 4/2011 | Walker et al. |
| 2011/0103151 A1 | 5/2011 | Kim et al. |
| 2011/0119467 A1 | 5/2011 | Cadambi et al. |
| 2011/0122695 A1 | 5/2011 | Li et al. |
| 2011/0140741 A1 | 6/2011 | Zerbe et al. |
| 2011/0179240 A1 | 7/2011 | Sukonik et al. |
| 2011/0219260 A1 | 9/2011 | Nobunaga et al. |
| 2011/0267883 A1 | 11/2011 | Lee et al. |
| 2011/0276974 A1 | 11/2011 | Chung et al. |
| 2011/0317496 A1 | 12/2011 | Bunce et al. |
| 2012/0005397 A1 | 1/2012 | Lim et al. |
| 2012/0017039 A1 | 1/2012 | Margetts |
| 2012/0023281 A1 | 1/2012 | Kawasaki et al. |
| 2012/0120705 A1 | 5/2012 | Mitsubori et al. |
| 2012/0134216 A1 | 5/2012 | Singh |
| 2012/0134225 A1 | 5/2012 | Chow |
| 2012/0134226 A1 | 5/2012 | Chow |
| 2012/0140540 A1 | 6/2012 | Agam et al. |
| 2012/0182798 A1 | 7/2012 | Hosono et al. |
| 2012/0195146 A1 | 8/2012 | Jun et al. |
| 2012/0198310 A1 | 8/2012 | Tran et al. |
| 2012/0246380 A1 | 9/2012 | Akerib et al. |
| 2012/0265964 A1 | 10/2012 | Murata et al. |
| 2012/0281486 A1 | 11/2012 | Rao et al. |
| 2012/0303627 A1 | 11/2012 | Keeton et al. |
| 2013/0003467 A1 | 1/2013 | Klein |
| 2013/0061006 A1 | 3/2013 | Hein |
| 2013/0107623 A1 | 5/2013 | Kavalipurapu et al. |
| 2013/0117541 A1 | 5/2013 | Choquette et al. |
| 2013/0124783 A1 | 5/2013 | Yoon et al. |
| 2013/0132702 A1 | 5/2013 | Patel et al. |
| 2013/0138646 A1 | 5/2013 | Sirer et al. |
| 2013/0163362 A1 | 6/2013 | Kim |
| 2013/0173888 A1 | 7/2013 | Hansen et al. |
| 2013/0205114 A1 | 8/2013 | Badam et al. |
| 2013/0219112 A1 | 8/2013 | Okin et al. |
| 2013/0227361 A1 | 8/2013 | Bowers et al. |
| 2013/0283122 A1 | 10/2013 | Anholt et al. |
| 2013/0286705 A1 | 10/2013 | Grover et al. |
| 2013/0326154 A1 | 12/2013 | Haswell |
| 2013/0332707 A1 | 12/2013 | Gueron et al. |
| 2014/0185395 A1 | 7/2014 | Seo |
| 2014/0215185 A1 | 7/2014 | Danielsen |
| 2014/0250279 A1 | 9/2014 | Manning |
| 2014/0344934 A1 | 11/2014 | Jorgensen |
| 2015/0029798 A1 | 1/2015 | Manning |
| 2015/0042380 A1 | 2/2015 | Manning |
| 2015/0063052 A1 | 3/2015 | Manning |
| 2015/0078108 A1 | 3/2015 | Cowles et al. |
| 2015/0120987 A1 | 4/2015 | Wheeler |
| 2015/0134713 A1 | 5/2015 | Wheeler |
| 2015/0270015 A1 | 9/2015 | Murphy et al. |
| 2015/0279466 A1 | 10/2015 | Manning |
| 2015/0324290 A1 | 11/2015 | Leidel |
| 2015/0325272 A1 | 11/2015 | Murphy |
| 2015/0356009 A1 | 12/2015 | Wheeler et al. |
| 2015/0356022 A1 | 12/2015 | Leidel et al. |
| 2015/0357007 A1 | 12/2015 | Manning et al. |
| 2015/0357008 A1 | 12/2015 | Manning et al. |
| 2015/0357019 A1 | 12/2015 | Wheeler et al. |
| 2015/0357020 A1 | 12/2015 | Manning |
| 2015/0357021 A1 | 12/2015 | Hush |
| 2015/0357022 A1 | 12/2015 | Hush |
| 2015/0357023 A1 | 12/2015 | Hush |
| 2015/0357024 A1 | 12/2015 | Hush et al. |
| 2015/0357047 A1 | 12/2015 | Tiwari |
| 2016/0011966 A1 | 1/2016 | Keeler et al. |
| 2016/0062672 A1 | 3/2016 | Wheeler |
| 2016/0062673 A1 | 3/2016 | Tiwari |
| 2016/0062692 A1 | 3/2016 | Finkbeiner et al. |
| 2016/0062733 A1 | 3/2016 | Tiwari |
| 2016/0063284 A1 | 3/2016 | Tiwari |
| 2016/0064045 A1 | 3/2016 | La Fratta |
| 2016/0064047 A1 | 3/2016 | Tiwari |
| 2016/0098208 A1 | 4/2016 | Willcock |
| 2016/0098209 A1 | 4/2016 | Leidel et al. |
| 2016/0110135 A1 | 4/2016 | Wheeler et al. |

(56) References Cited

U.S. PATENT DOCUMENTS

| | | |
|---|---|---|
| 2016/0125919 A1 | 5/2016 | Hush |
| 2016/0154596 A1 | 6/2016 | Willcock et al. |
| 2016/0155482 A1 | 6/2016 | La Fratta |
| 2016/0188250 A1 | 6/2016 | Wheeler |
| 2016/0196142 A1 | 7/2016 | Wheeler et al. |
| 2016/0196856 A1 | 7/2016 | Tiwari et al. |
| 2016/0225422 A1 | 8/2016 | Tiwari et al. |
| 2016/0266873 A1 | 9/2016 | Tiwari et al. |
| 2016/0266899 A1 | 9/2016 | Tiwari |
| 2016/0267951 A1 | 9/2016 | Tiwari |
| 2016/0292080 A1 | 10/2016 | Leidel et al. |
| 2016/0306584 A1 | 10/2016 | Zawodny et al. |
| 2016/0306614 A1 | 10/2016 | Leidel et al. |
| 2016/0365129 A1 | 12/2016 | Willcock |
| 2016/0371033 A1 | 12/2016 | La Fratta et al. |
| 2016/0378403 A1 | 12/2016 | Bose et al. |
| 2017/0052906 A1 | 2/2017 | Lea |
| 2017/0153923 A1 | 6/2017 | Choi et al. |
| 2017/0178701 A1 | 6/2017 | Willcock et al. |
| 2017/0192844 A1 | 7/2017 | Lea et al. |
| 2017/0228192 A1 | 8/2017 | Willcock et al. |
| 2017/0235515 A1 | 8/2017 | Lea et al. |
| 2017/0236564 A1 | 8/2017 | Zawodny et al. |
| 2017/0242902 A1 | 8/2017 | Crawford et al. |
| 2017/0243623 A1 | 8/2017 | Kirsch et al. |
| 2017/0262369 A1 | 9/2017 | Murphy |
| 2017/0263306 A1 | 9/2017 | Murphy |
| 2017/0269865 A1 | 9/2017 | Willcock et al. |
| 2017/0269903 A1 | 9/2017 | Tiwari |
| 2017/0277433 A1 | 9/2017 | Willcock |
| 2017/0277440 A1 | 9/2017 | Willcock |
| 2017/0277581 A1 | 9/2017 | Lea et al. |
| 2017/0277637 A1 | 9/2017 | Willcock et al. |
| 2017/0278559 A1 | 9/2017 | Hush |
| 2017/0278584 A1 | 9/2017 | Rosti |
| 2017/0285988 A1 | 10/2017 | Dobelstein |
| 2017/0293434 A1 | 10/2017 | Tiwari |
| 2017/0301379 A1 | 10/2017 | Hush |

FOREIGN PATENT DOCUMENTS

| | | |
|---|---|---|
| EP | 2026209 | 2/2009 |
| JP | H0831168 | 2/1996 |
| JP | 2009259193 | 3/2015 |
| KR | 10-0211482 | 8/1999 |
| KR | 10-2010-0134235 | 12/2010 |
| KR | 10-2013-0049421 | 5/2013 |
| WO | 00-29959 | 5/2000 |
| WO | 2001065359 | 9/2001 |
| WO | 2006117746 | 11/2006 |
| WO | 2010079451 | 7/2010 |
| WO | 2013062596 | 5/2013 |
| WO | 2013081588 | 6/2013 |
| WO | 2013095592 | 6/2013 |

OTHER PUBLICATIONS

Stojmenovic, "Multiplicative Circulant Networks Topological Properties and Communication Algorithms", (25 pgs.), Discrete Applied Mathematics 77 (1997) 281-305.

Boyd et al., "On the General Applicability of Instruction-Set Randomization", Jul.-Sep. 2010, (14 pgs.), vol. 7, Issue 3, IEEE Transactions on Dependable and Secure Computing.

Elliot, et al., "Computational RAM: Implementing Processors in Memory", Jan.-Mar. 1999, (10 pgs.), vol. 16, Issue 1, IEEE Design and Test of Computers Magazine.

International Search Report and Written Opinion for related PCT Application No. PCT/US2018/052921, dated Apr. 29, 2020, 15 pages.

Notice of Reasons for Rejection for related Korea Patent Application No. 10-2020-7014311, dated May 14, 2021, 12 pages.

Dybdahl, et al., "Destructive-Read in Embedded DRAM, Impact on Power Consumption," Apr. 2006, (10 pgs.), vol. 2, Issue 2, Journal of Embedded Computing-Issues in embedded single-chip multicore architectures.

Kogge, et al., "Processing In Memory: Chips to Petaflops," May 23, 1997, (8 pgs.), retrieved from: http://www.cs.ucf.edu/courses/cda5106/summer02/papers/kogge97PIM.pdf.

Draper, et al., "The Architecture of the DIVA Processing-In-Memory Chip," Jun. 22-26, 2002, (12 pgs.), ICS '02, retrieved from: http://www.isi.edu/~draper/papers/ics02.pdf.

Adibi, et al., "Processing-In-Memory Technology for Knowledge Discovery Algorithms," Jun. 25, 2006, (10 pgs.), Proceeding of the Second International Workshop on Data Management on New Hardware, retrieved from: http://www.cs.cmu.edu/~damon2006/pdf/adibi06inmemory.pdf.

U.S. Appl. No. 13/449,082, entitled, "Methods and Apparatus for Pattern Matching," filed Apr. 17, 2012, (37 pgs.).

U.S. Appl. No. 13/743,686, entitled, "Weighted Search and Compare in a Memory Device," filed Jan. 17, 2013, (25 pgs.).

U.S. Appl. No. 13/774,636, entitled, "Memory as a Programmable Logic Device," filed Feb. 22, 2013, (30 pgs.).

U.S. Appl. No. 13/774,553, entitled, "Neural Network in a Memory Device," filed Feb. 22, 2013, (63 pgs.).

U.S. Appl. No. 13/796,189, entitled, "Performing Complex Arithmetic Functions in a Memory Device," filed Mar. 12, 2013, (23 pgs.).

International Search Report and Written Opinion for PCT Application No. PCT/US2013/043702, dated Sep. 26, 2013, (11 pgs.).

Pagiamtzis, et al., "Content-Addressable Memory (CAM) Circuits and Architectures: A Tutorial and Survey", Mar. 2006, (16 pgs.), vol. 41, No. 3, IEEE Journal of Solid-State Circuits.

Pagiamtzis, Kostas, "Content-Addressable Memory Introduction", Jun. 25, 2007, (6 pgs.), retrieved from: http://www.pagiamtzis.com/cam/camintro.

Debnath, Biplob, Bloomflash: Bloom Filter on Flash-Based Storage, 2011 31st Annual Conference on Distributed Computing Systems, Jun. 20-24, 2011, 10 pgs.

Derby, et al., "A High-Performance Embedded DSP Core with Novel SIMD Features", Apr. 6-10, 2003, (4 pgs), vol. 2, pp. 301-304, 2003 IEEE International Conference on Accoustics, Speech, and Signal Processing.

Extended European Search Report for related EP Patent Application No. 18870007.4, dated Jul. 5, 2021, 12 pages.

Luo et al., "Design and Realization of an Optimized Memory Access Scheduler", 2010 IEEE Third International Joint Conference on Computational Science and Optimization (CSO), Piscataway, NJ, May 28, 2010, pp. 288-292.

COMMAND SELECTION POLICY

PRIORITY INFORMATION

This application is a Continuation of U.S. application Ser. No. 16/103,585, filed Aug. 14, 2018, which issues as U.S. Pat. No. 10,831,682 on Nov. 10, 2020, which is a Continuation of U.S. application Ser. No. 15/791,886, filed Oct. 24, 2017, which issued as U.S. Pat. No. 10,409,739 on Sep. 10, 2019, the contents of which are included herein by reference.

TECHNICAL FIELD

The present disclosure relates generally to memory, and more particularly, to apparatuses and methods associated with command selection policy.

BACKGROUND

Memory devices are typically provided as internal, semiconductor, integrated circuits in computers or other electronic devices. There are many different types of memory including volatile and non-volatile memory. Volatile memory can require power to maintain its data and includes random-access memory (RAM), dynamic random access memory (DRAM), and synchronous dynamic random access memory (SDRAM), among others. Non-volatile memory can provide persistent data by retaining stored data when not powered and can include NAND flash memory, NOR flash memory, read only memory (ROM), Electrically Erasable Programmable ROM (EEPROM), Erasable Programmable ROM (EPROM), and resistance variable memory such as phase change random access memory (PCRAM), resistive random access memory (RRAM), and magnetoresistive random access memory (MRAM), among others.

Memory is also utilized as volatile and non-volatile data storage for a wide range of electronic applications. Non-volatile memory may be used in, for example, personal computers, portable memory sticks, digital cameras, cellular telephones, portable music players such as MP3 players, movie players, and other electronic devices. Memory cells can be arranged into arrays, with the arrays being used in memory devices.

Various computing systems include processing resources that are coupled to memory (e.g., a memory system), which is accessed in association with executing a set of instruction (e.g., a program, applications, etc.). A memory system can implement a scheduling policy used to determine an order in which commands (e.g., reads and writes) received from the processing resources are executed by the memory system. Such scheduling policies can affect computing system performance since execution time of programs being executed on the computing system is affected by the execution time associated with access requests to the memory, for example.

DETAILED DESCRIPTION

Figure 1:
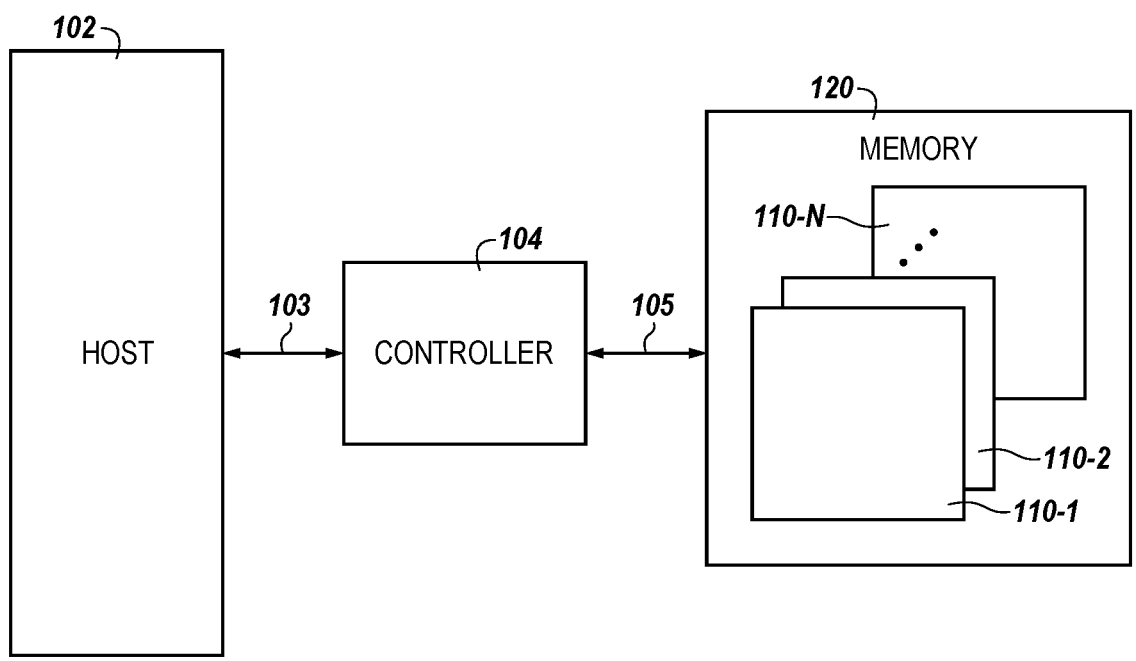
FIG. 1 is a block diagram of an apparatus in the form of a computing system including a memory system and capable of implementing a command selection policy in accordance with a number of embodiments of the present disclosure.

The present disclosure includes apparatuses and methods related to command selection policy. An example method can include receiving a plurality of commands to a memory controller, inserting each command of the plurality into one of a plurality of priority queues based on a category of the respective command, and selecting, from one of the priority queues, at least one command of the plurality to issue to the memory controller based on the priority of the queue and the category of the at least one command.

A number of embodiments of the present disclosure can provide an improved command selection policy as compared to previous approaches. For instance, some prior command selection policies include FCFS (first-come, first-served) and FRFCFS (first-ready, first-come, first-served). A FCFS policy can include scheduling commands received to a memory controller for execution by a memory device (e.g., a main memory such as a DRAM device) based on the order in which the commands were received by (e.g., decoded) the controller. Therefore, oldest commands are executed first. However, various memory systems include timing constraints that can affect whether a command can be issued (e.g., from the memory controller to the memory device). For example, various support circuitry associated with a memory array (e.g., row decode circuitry, column decode circuitry, sense amplifier circuitry, precharge circuitry, refresh circuitry, etc.) can include timing constraints that determine when/if a particular command is ready for execution by the memory device. Accordingly, a FCFS policy can increase execution latency since a newer command may be ready for issuance to the memory device (e.g., based on the timing constraints) but the command cannot be sent to the memory device until the older command is executed.

A FRFCFS policy can reduce latency as compared to a FCFS policy. For example, in the FRFCFS policy, a memory controller may iterate through the command queue and select the first command it encounters that is ready to be issued. Therefore, an older command not yet ready may be skipped over in favor of a newer pending command that is ready.

As an example, a FRFCFS policy may include prioritizing column commands over row commands such that the policy includes searching the command queue for the oldest column command ready to be issued and if an issuable column command is not found, the oldest row command that is ready to be issued is selected for issuance to the memory device. As those skilled in the art appreciate, memory and storage arrays may be organized logically or physically, or both, in columns and rows. So, as used herein, a "column" command refers to a command directed to an address corresponding to an open (e.g., activated) row (e.g., page) of an array of the memory device, and a "row" command refers to a command directed to an address corresponding to a closed (e.g., deactivated) row of the array.

Neither the FCFS policy nor FRFCFS policy prioritizes read commands (e.g., over write commands). Prioritizing read commands can improve system performance since various instructions executed by a processing resource (e.g., a central processing unit) can be dependent on execution of other instructions. For example, various instructions to be executed by a CPU may be dependent upon a read command issued to a memory system. Therefore, the dependent instructions cannot be executed by the CPU until the data corresponding to the read command is returned to the CPU. As such, delay in execution of read commands sent to the memory system can result in delay in program execution.

A number of embodiments of the present disclosure can implement a command selection policy that prioritizes read commands over write commands, which can provide benefits such as reducing latency associated with read access requests to memory, among other benefits. As described further herein, a number of embodiments include implementing a command selection policy that has similarities to a FRFCFS policy along with a strict read priority. A number of embodiments can be implemented via execution of instructions stored on machine-readable media, which can include various non-transitory media including, but not limited to, volatile and/or nonvolatile memory, such as solid-state memories, phase-change memory, ferroelectric memory, optical media, and/or magnetic media among other types of machine readable media.

In the following detailed description of the present disclosure, reference is made to the accompanying drawings that form a part hereof, and in which is shown by way of illustration how a number of embodiments of the disclosure may be practiced. These embodiments are described in sufficient detail to enable those of ordinary skill in the art to practice the embodiments of this disclosure, and it is to be understood that other embodiments may be utilized and that process, electrical, and/or structural changes may be made without departing from the scope of the present disclosure. As used herein, the designator "N" indicates that a number of the particular feature so designated can be included with a number of embodiments of the present disclosure.

As used herein, "a number of" something can refer to one or more of such things. For example, a number of memory devices can refer to one or more of memory devices. A "plurality" of something intends two or more. Additionally, designators such as "N," as used herein, particularly with respect to reference numerals in the drawings, indicates that a number of the particular feature so designated can be included with a number of embodiments of the present disclosure.

The figures herein follow a numbering convention in which the first digit or digits correspond to the drawing figure number and the remaining digits identify an element or component in the drawing. Similar elements or components between different figures may be identified by the use of similar digits. As will be appreciated, elements shown in the various embodiments herein can be added, exchanged, and/or eliminated so as to provide a number of additional embodiments of the present disclosure. In addition, the proportion and the relative scale of the elements provided in the figures are intended to illustrate various embodiments of the present disclosure and are not to be used in a limiting sense.

FIG. 1 is a block diagram of an apparatus in the form of a computing system including a memory system 120 and capable of implementing a command selection policy in accordance with a number of embodiments of the present disclosure. As used herein, an "apparatus" can refer to, but is not limited to, a variety of structures or combinations of structures, such as a circuit or circuitry, a die or dice, a module or modules, a device or devices, or a system or systems. For example, controller 104, host 102, system 120, and/or devices 110-1 to 110-N may separately be referred to as an "apparatus".

In this example, the computing system includes a host 102 coupled to a controller 104 (e.g., via an interface 103), which is coupled to the memory system 120 (e.g., via an interface 105). The computing system can be a laptop computer, personal computers, digital camera, digital recording and playback device, mobile telephone, PDA, memory card reader, interface hub, sensor, Internet-of-Things (IoT) enabled device, among other systems, and the host 102 can include a number of processing resources (e.g., one or more processors) capable of accessing memory 120 (e.g., via controller 104). The host 102 may be responsible for execution of an operating system (OS) and/or various applications that can be loaded thereto (e.g., from memory system 120 via controller 104).

The controller 104 may receive memory transaction requests (e.g., in the form of read and write commands, which may be referred to as load and store commands, respectively) from the host 102. The controller 104 can transfer commands and/or data between the host 102 and the memory system 120 over the interfaces 103 and 105, which can comprise physical interfaces such as buses, for example, employing a suitable protocol. Such protocol may be custom or proprietary, or one or both interfaces 103 and 105 may employ a standardized protocol, such as Peripheral Component Interconnect Express (PCIe), Gen-Z, CCIX, or the like. The controller 104 can comprise control circuitry, in the form of hardware, firmware, or software, or any combination of the three. As an example, the controller 104 can comprise a state machine, a sequencer, and/or some other type of control circuitry, which may be implemented in the form of an application specific integrated circuit (ASIC) coupled to a printed circuit board. In a number of embodiments, the controller 104 may be co-located with the host 102 (e.g., in a system-on-chip (SOC) configuration). Also, the controller 104 may be co-located with the memory system 120. The controller 104 can be, for example, a controller such as controller 204 described in association with FIG. 2 and can be configured to implement a command selection policy in accordance with a number of embodiments of the present disclosure as described further below.

As shown in FIG. 1, the memory system 120 includes a number of memory devices 110-1, 110-2, . . . , 110-N, which may be referred to collectively as memory 110. The memory 110 can comprise a number of physical memory "chips," or dice which can each include a number of arrays (e.g., banks) of memory cells and corresponding support circuitry (e.g., address circuitry, I/O circuitry, control circuitry, read/write circuitry, etc.) associated with accessing the array(s) (e.g., to read data from the arrays and write data to the arrays). As an example, the memory devices 110-1 to 110-N can include a number of DRAM devices, SRAM devices, PCRAM devices, RRAM devices, FeRAM, phase-change memory, 3DXpoint, and/or Flash memory devices. In a number of embodiments, the memory system 110 can serve as main memory for the computing system.

Figure 2:
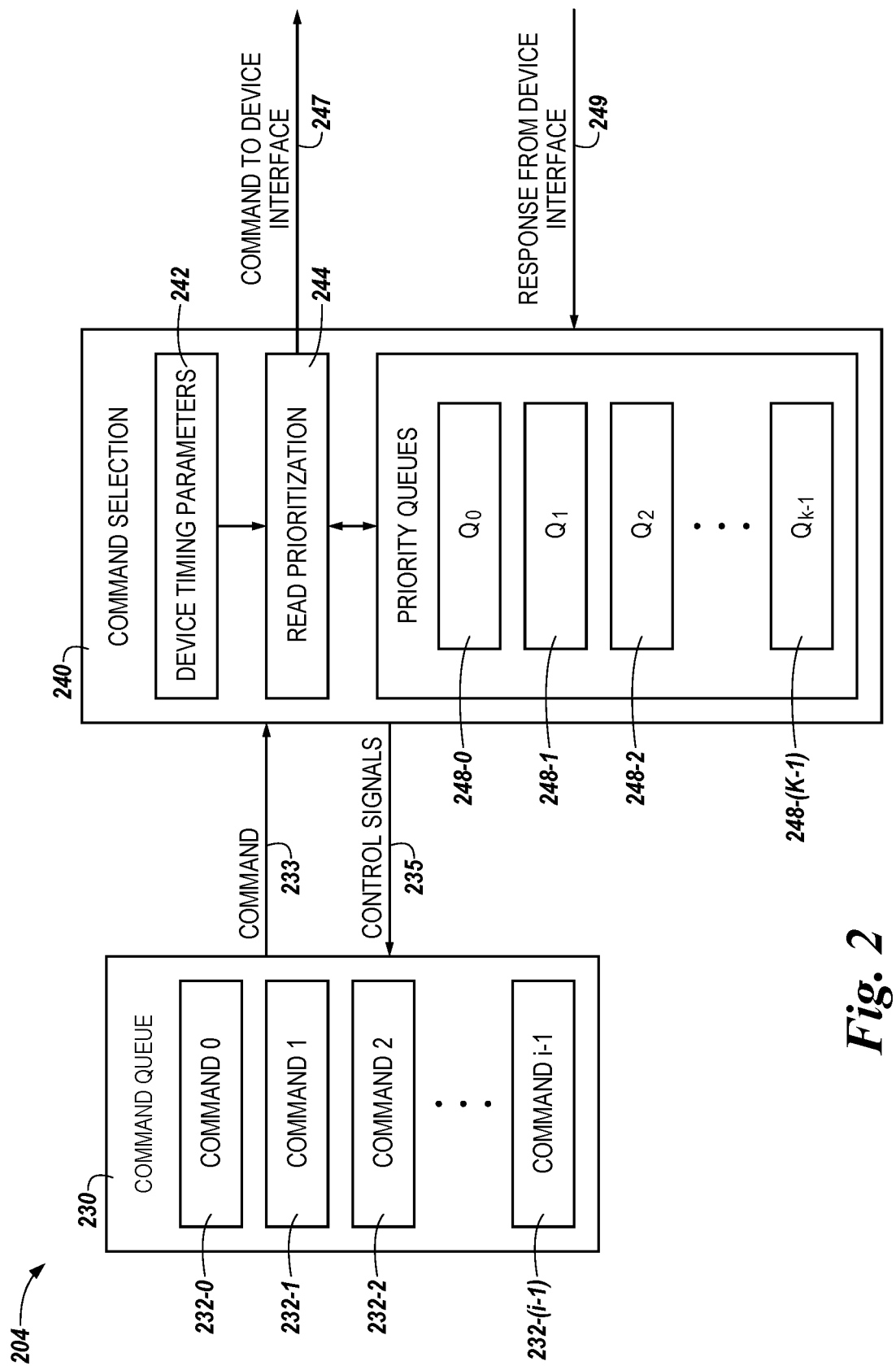
FIG. 2 is block diagram of a controller capable of implementing a command selection policy in accordance with a number of embodiments of the present disclosure.

FIG. 2 is block diagram of a controller 204 capable of implementing a command selection policy in accordance with a number of embodiments of the present disclosure. The controller 204 can be a portion of a controller such as controller 104 shown in FIG. 1. For example, the controller 204 can represent a command selection subsystem of controller 104 used to implement a particular command selection policy. As used herein, a command selection policy may be referred to as a command scheduling policy and can refer to selecting commands and/or scheduling (e.g., prioritizing) commands for issuance to a memory device. An example of a command selection policy implementable by controller 204 is described further in association with the flow chart shown in FIG. 3.

The controller 204 includes a command queue 230 to store commands 232-0, 232-1, 232-2, . . . , 232-($i$-1) (referred to collectively as commands 232) associated with incoming access requests to a memory system (e.g., 120) received from a device such as a host (e.g., 102). The controller 204 can decode the incoming access requests and categorize the corresponding commands 232 in accordance with a desired command selection policy. As an example, received commands 232 can be categorized based on various factors including, but not limited to, command type (e.g., read or write), command address (e.g., whether the command targets an open or closed row of the memory device), and/or command age (e.g., time since being received), among various other factors including a relationship of one command to another (e.g., a read-after-write dependence).

As shown in FIG. 2, the controller 204 can include command selection logic 240 used to implement a desired command selection policy. In this example, the command selection logic 240 includes a plurality of prioritized queues 248-0 ($Q_0$), 248-1 ($Q_1$), 248-2 ($Q_2$), . . . , 248-($k$-1) ($Q_{k-1}$), which can be referred to collectively as prioritized queues 248, as well as timing parameter logic 242 and prioritization logic 244 used to implement a desired command selection policy.

The timing parameter logic 242 can be responsible for tracking various timing constraints associated with accessing a memory device to which commands will be issued. Such timing constraints can include constraints such as timing of various control signals (e.g., read/write enable signals) and/or address signals (e.g., row/column address signals), among various other signals. For example, if the memory device is a DRAM device, such timing parameters can include a minimum time required between an activate command and a column command (e.g., tRCD), a minimum time required between column commands (e.g., tCCD), a minimum time between a precharge command and an activate command (e.g., tRP), among various other timing parameters (e.g., tRAS, tCAS, tCP, tASR, tASC, tCAH, etc.). The logic 242 can be used, for example, to determine whether commands in the prioritized queues 248 are ready to issue (e.g., whether the commands can be sent to the memory device for execution without violating the device timing parameters). As used herein, the term "queue" is not intended to be limited to a specific data structure implementation, but rather the term queue can refer to a collection of elements organized in various manners and which can have characteristics of one or more different types of queues and/or lists (e.g., a list, a linked list, etc.), among others.

The prioritization logic 244 can be responsible for iterating through the commands 232 in queue 230, determining designated priority categories for the received commands 232, inserting the commands 232 selected ones of the priority queues 248, and iterating through the plurality of queues 248 (in order of priority) to select a particular command to issue to the memory device. In FIG. 2, arrow 247 represents a selected command sent to the memory device, and arrow 249 represents a response (e.g., corresponding to the selected command) from the memory device. Arrow 233 represents a command 232 provided to command selection logic 240 for insertion into one of the priority queues 248 based on its designated category and corresponding priority level. Arrow 235 represents control signals associated with, for example, command selection logic 240 iterating through the commands 232 and removing commands 232 from queue 230 once they have been issued to the memory device.

In a number of embodiments, the prioritized queues 248 are indexed in priority order such that queue 248-0 has a highest priority and queue 248-($k$-1) has a lowest priority. Queues having different priorities may be referred to as having a first priority, a second priority, a third priority, and the like. The difference in priority of one queue is relative to another queue. So, a "higher" priority queue is given or has priority over another queue. The highest priority queue thus has the highest priority of the prioritized queues 248, and the lowest priority queue has the lowest priority of the prioritized queues 248.

The priority order of commands 232 within the respective priority queues 248 can be based on the age of the commands such that the oldest command in a respective queue 248 has a highest priority and will be encountered first when iterating through the respective queue. As an example, iterating through at least some of the priority queues 248 can include using a FRFCFS policy in which a first command ready for issuance (e.g., based on the device timing parameters) that is encountered is selected for issuance. However, as described further below, in a number of embodiments, iterating through the queues 248 can include ignoring lower priority queues under certain circumstances, which may prevent issuable commands in at least one queue having a priority lower than a highest priory queue (e.g., 248-0) from issuing (e.g., responsive to determining the highest priority queue is not empty). Also, unlike an FRFCFS policy in which column commands (e.g., both column read commands and column write commands) are prioritized over row commands (e.g., both row read commands and row write commands), a number of embodiments of the present disclosure implement a modified FRFCFS selection policy in which read commands (e.g., both column read commands and row read commands) are prioritized over write commands (e.g., both column write commands and row write commands), which can provide improved system performance (e.g., via reduced latency) as compared to various other selection policies.

Each command 232 can receive one of a plurality of priority category designations. The priority category designations can correspond to respective different priority queues 248. For instance, commands receiving a designation corresponding to a highest priority are inserted into the highest priority queue 248-0, commands receiving a designation corresponding to a next highest priority are inserted into the next highest priority queue 248-1, etc. The designated priority category for each command 232 can be determined based on various factors such as whether the command is a read or write command, the type of read/write command (e.g., whether the command is a column read/write or a row read/write command), and the age of the command, among other factors.

In a number of embodiments, read commands are prioritized over write commands such that if any one of the priority queues 248 contains a read command, then no write command will be selected for issuance. However, in a number of embodiments that include prioritizing read commands, the priority category designation of a write command can depend, for example, on whether the controller 204 detects a read-after-write dependence associated with the write command (e.g., due to a determination that the write command targets a same page as a received read command 232). The determined read-after-write dependence associated with a write command can result in designating the write command a higher priority category than if the write command were not associated with a read-after-write dependence such that the write command is inserted into a higher priority queue 248 than it otherwise would have been and may therefore be issued before one or more read commands contained in queues 248.

As used herein, a read-after-write dependence refers to situation in which an error may result if a read command that targets a particular address (e.g., page of memory) executes before the targeted data is stored at the target page (e.g., because a command to write the targeted data to the targeted page has not yet been executed). As such, in a number of embodiments of the present disclosure, if the priority queues 248 include any read commands, then a write command will be selected for issue only if a read-after-write dependence is detected (e.g., a write command will not be issued unless there exists a read that depends on the write). Inserting a write command into a higher priority queue than it otherwise would have been (e.g., due to a detected read-after-write dependence) can provide benefits such as preventing a "deadlock" situation in which a write command is not allowed to issue (e.g., because read commands are prioritized over write commands), but the corresponding read command is not allowed to issue because of the read-after-write dependence.

As described further below in association with FIGS. 3A and 3B, in a number of embodiments in which read commands are prioritized over write commands, column read commands can be prioritized over row read commands. For instance, received column read commands can be inserted into a highest priority queue 248-0 and received row read commands can be inserted into a next highest priority queue 248-1. In some example, unless a read-after-write dependence is detected for received write commands, the received column write commands can be inserted into a lower priority queue (e.g., 248-2 to 248-($k$−1)). In a number of embodiments, column write commands can be prioritized over row write commands such that the received row write commands are inserted into a lower priority queue than received column write commands. For instance, received column write commands can be inserted into a third highest priority queue 248-2 and received row write commands can be inserted into a fourth highest priority queue 248-3. As noted above, due to a detected read-after-write dependence, a received write command may be designated a same priority category as a read command which can result in insertion of the write command into one of the higher priority queues (e.g., 248-0 if the write command is to an open page and 248-1 if the write command is to a closed page).

In operation, once the controller 204 has inserted the received commands 232 into the appropriate prioritized queues 248 in accordance with the command selection policy, the commands within the queues 248 are iterated through in order, starting with the commands in the highest priority queue 248-0, and a first command encountered that is determined to be ready for issuance is selected. In some examples, responsive to a determination that the highest priority queue 248-0 does not contain an issuable command, the controller 204 searches the second highest priority queue 248-1 and selects the first command encountered that is determined to be issuable. In a number of embodiments, the controller 204 can be configured to prevent selection of any commands from the lower priority queues if either of the highest priority queue 248-0 or second highest priority queue 248-1 currently contain a command. For instance, queues 248 lower in priority than queues 248-0 and 248-1 may be ignored when iterating through queues 248 during command selection (e.g., such that queues 248-2 and below are not reached).

In the example above in which the first and second highest priority queues 248-0 and 248-1 contain column read commands and row read commands, respectively, no write commands would be selected for issuance, unless, for instance, a write command were inserted into one of queues 248-0 and 248-1 due to a determined read-after-write dependence (e.g., because queue 248-2 would not be reached). Accordingly, in a number of embodiments, if the highest priority queues (e.g., 248-0 and 248-1) include only non-issuable commands, then even issuable commands in the lower priority queues (e.g., 248-2 to 248-($k$−1)) will not issue (e.g., since the lower priority queues will be ignored when iterating through them for command selection).

Figure 3A:
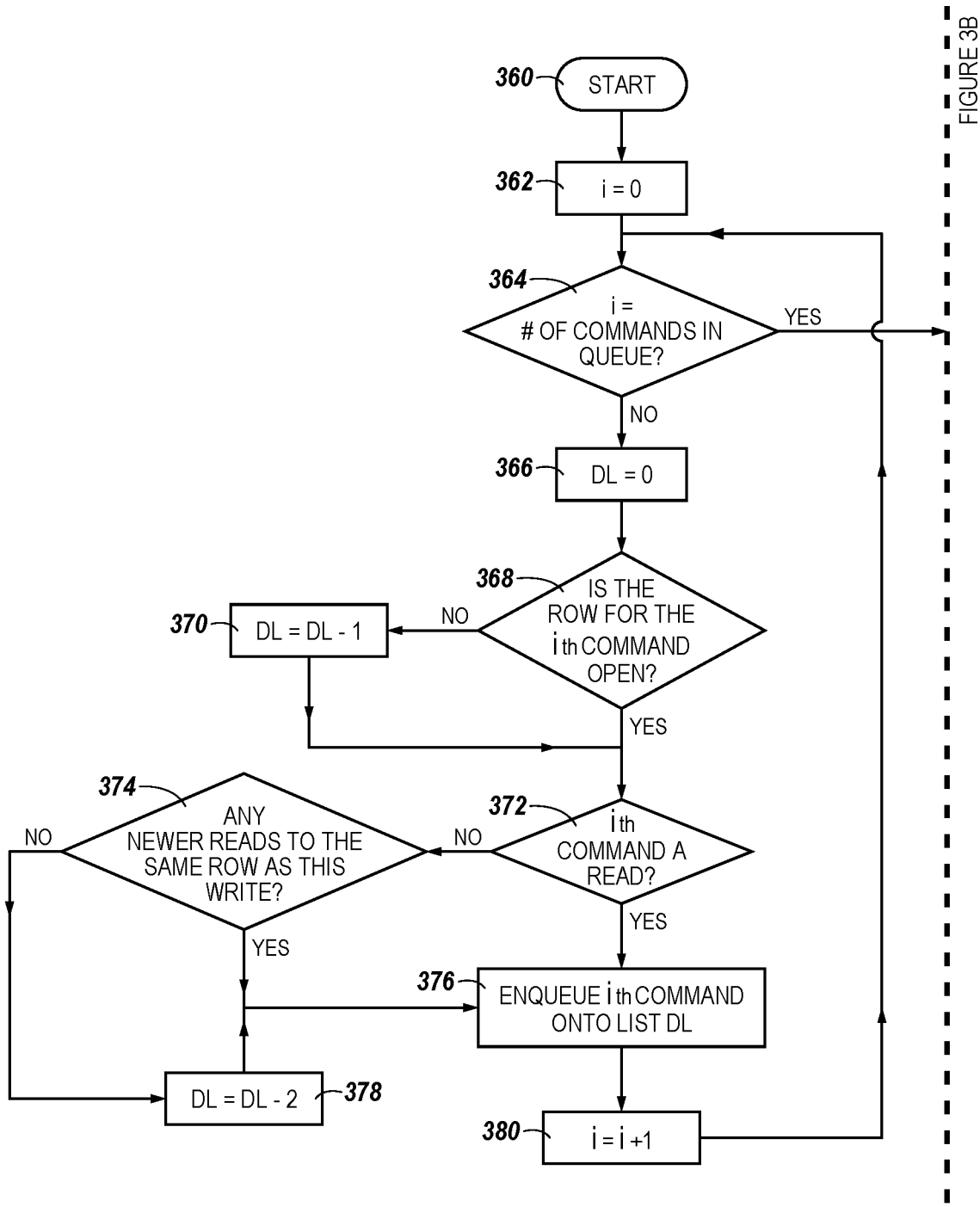
FIGS. 3A and 3B illustrate a flow chart associated with implementing a command selection policy in accordance with a number of embodiments of the present disclosure.
Figure 3B:
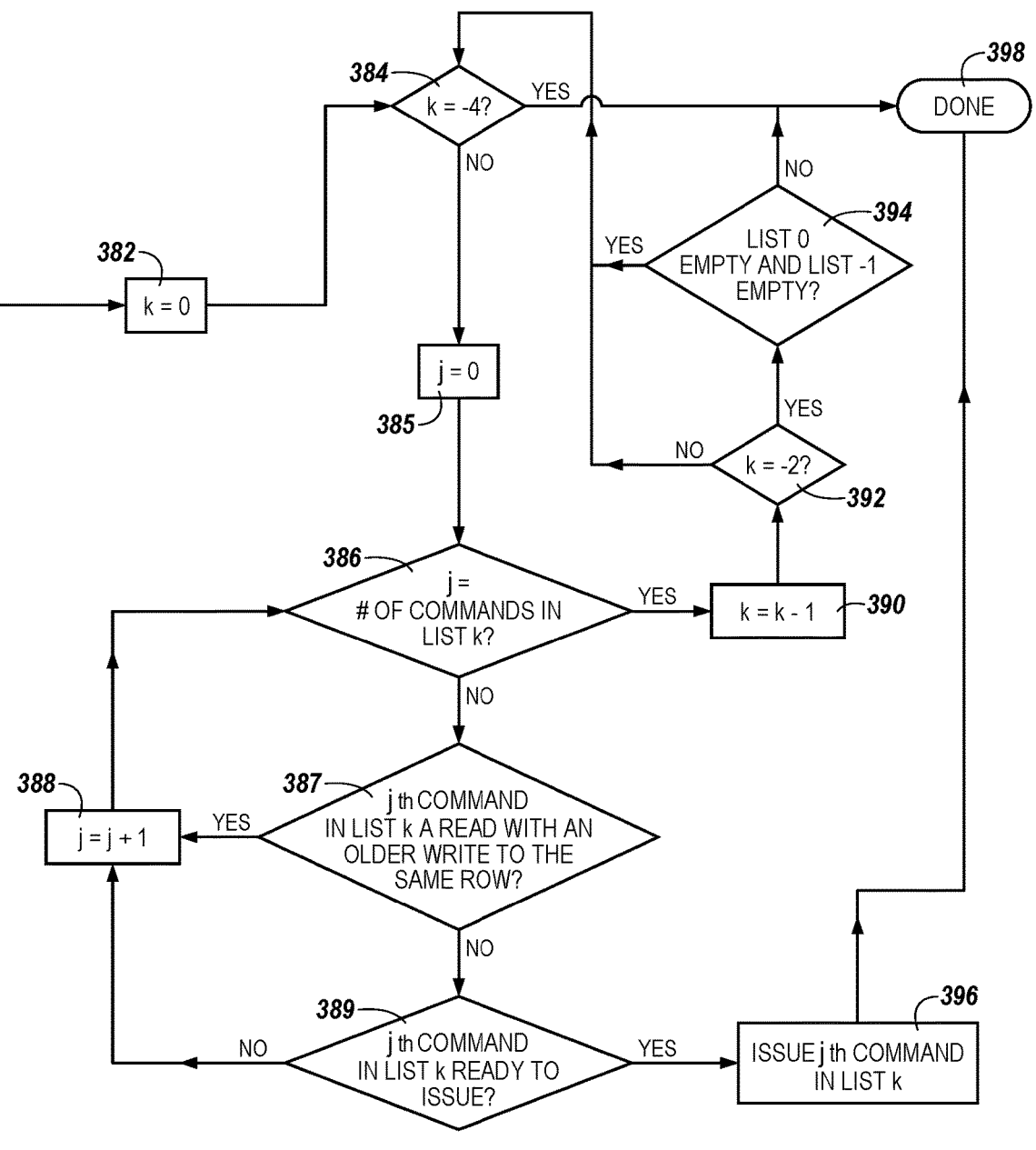

FIGS. 3A and 3B illustrate a flow chart associated with implementing a command selection policy in accordance with a number of embodiments of the present disclosure. The method described in FIGS. 3A and 3B can be executed, for example, by a controller such as controller 104 and/or 204 described above. The example described in association with FIGS. 3A and 3B assumes a command selection policy that utilizes four priority queues (e.g., prioritized queues 248 described in FIG. 2), and in which column read commands are prioritized over row read commands, row read commands are prioritized over column write commands, and column write commands are prioritized over row write commands, in general. Other quantities of priority queues are contemplated, as are other examples and implementations. The priority queues may be referred to as "lists" or "destination lists". In FIGS. 3A and 3B, the designator "i" is used as an index in reference to received commands in a command queue (e.g., received commands 232 in command queue 230 shown in FIG. 2). The designator "DL" is used as an index to reference the four prioritized queues (e.g., destination lists DL=0 to DL=−3). The designator "k" is an index and references the four destination lists while iterating through them. The designator "j" is used as an index and references the commands within a particular destination list "k" while iterating through the commands with the particular destination list.

FIG. 3A is associated with categorizing received commands and inserting them into the appropriate one of the prioritized queues based on the categorization, and FIG. 3B is associated with iterating through the prioritized queues (and the commands therein), determining whether the commands are issuable (e.g., ready to issue), selecting commands for issue, and issuing the selected commands to a memory device.

At 360 the command selection operation starts. At 362, the index "i" is initialized to "0" and at 364 it is determined whether the command queue (e.g., 230) includes any more commands to be inserted in one of the prioritized lists (e.g., condition i=0 being met indicates the command queue is empty). If there are no more received commands to be enqueued, then flow moves to FIG. 3B. However, if there are received commands yet to be added to the priority queues, then at 366 index "DL" is initialized to "0", and at 368 a determination is made as to whether the row to which the "ith" command in the received command queue targets an open row (e.g., whether the "ith" command is a column command). Responsive to the "ith" command targeting a closed row (e.g., the command is either a row read command or a row write command), at 370 the index "DL" is decremented (by 1) prior to determining at 372 whether the "ith" command is a read command. Responsive to the "ith"

command being a read command, at 376 the command is enqueued onto list "DL". Therefore, if the "ith" command is a column read command it will be inserted into the prioritized queue corresponding to DL=0 (e.g., the highest priority queue), and if the "ith" command is a row read command it will be inserted into the prioritized queue corresponding to DL=−1 (e.g., a second highest priority queue). In a number of embodiments, the indices corresponding to the prioritized queues can start at "0" and decrease such that lower priority queues may be appended to the end of the list of priority queues, which can be beneficial by providing the ability to determine the relative priority of two different priority queues without complementing the results of comparison operations (e.g., queue with index "m" has lower priority than queue with index "n" if and only if m<n). As shown at 380, subsequent to the "ith" command being inserted into the appropriate prioritized queue, the index "i" is incremented (by 1) such that the next command in the queue of received commands is evaluated, and if the "ith" command targets an open row, then at 372 it is determined whether the "ith" command is a read command.

If it is determined at 372 that the "ith" command is not a read command (e.g., the command is a write command), then at 374 it is determined whether there are any newer (e.g., received more recently) read commands targeted to the same row as the present write command (e.g., if there is a read-after-write dependence associated with the present write command). If there is a newer read command to the same row as the present write command, then at 376 the present write command is inserted into either the highest priority queue corresponding to DL=0 or into the second highest priority queue corresponding to DL=−1. However, if the present write command does not target a same row as a newer read command, then at 378 the index "DL" is decremented (by 2) prior to being inserted into the appropriate priority queue at 376. Therefore, if the write command does not target a same row as a newer write command, it will be inserted into the priority queue corresponding to DL=−2 (e.g., the third highest priority queue) if it is a column write command, and it will be inserted into the priority queue corresponding to DL=−3 (e.g., the lowest priority queue in this example) if it is a row write command.

Once the condition at 364 is met (e.g., there are no more received commands in the received command queue to be inserted into the prioritized queues), at 382 index "k" is initialized to "0". Box 384 represents a check to determine whether or not all four of the prioritized queues have been iterated through. In this example, when the condition k=−4 is met at 384, then the command selection operation is done, as shown at 398. At 385, the index "j" is initialized to "0" and at 386 the present value of index "j" is compared to the quantity of commands in the prioritized queue corresponding to index "k". If the value of index "j" does not equal the quantity of commands in the prioritized queue corresponding to index "k" (e.g., the queue corresponding to index "k" includes commands yet to be evaluated), then at 387 a determination is made whether the "jth" command in the prioritized queue corresponding to index "k" is a read command targeted to a same row as a row to which an older write command is targeted.

Responsive to determining that the "jth" command is not directed to a same row as an older write command, at 389 it is determined whether the "jth" command is ready to issue. As noted above, whether the controller determines a particular command to be issuable or not can depend on various timing parameters associated with a memory device, for example. If the "jth" command is determined to be ready, then at 396 the command is issued to the memory device and the selection operation ends. If the "jth" command is determined not to be ready for issuance at 389, then at 388 the index "j" is incremented (by 1) and the comparison at 386 is again performed.

Responsive to determining, at 387, that the "jth" command is directed to a same row as an older write command, at 388 the index "j" is incremented (by 1) and the comparison at 386 is again performed. In this manner, the check at 387 ensures that a read command directed to a same row as an older write will not be issued until the older write issues.

As shown at 386, once all the commands in the prioritized queue corresponding to index "k" are evaluated, the index "k" is decremented (by 1) at 390. At 392, a check of whether k=−2 is performed. If "k" does not equal −2, then a check of whether k=−4 is performed at 384.

If k=−2 at 392, then at 394 a determination is made regarding whether the highest priority queue (e.g., the queue designated as priority "0" and corresponding to index k=0) and the next highest priority queue (e.g., the queue designated as priority "−1" and corresponding to index k=−1) are empty. If the two highest priority queues are empty, then the command selection process continues at 384. However, if the two highest priority queues are determined at 394 to not be empty, then the command selection operation ends at 398, without a command being issued. In this manner, the prioritized queues having a lower priority than the two highest priority queues are skipped if either of the two highest priority queues contain any commands. Therefore, in this example, in which column read commands are inserted into the highest priority queue (e.g., priority queue "0") and row read commands are inserted into the next highest priority queue (e.g., priority queue "−1"), no commands (e.g., write commands) in either of the two lower priority queues (e.g., priority queues "−2" and "−3") will be selected for issuance to the memory device, even if they are ready to issue if either of the two higher priority queues contain any commands. Preventing issuable write commands in the lower priority queues from issuing ahead of non-issuable read commands can avoid latency penalties that can be incurred in association with issuing writes ahead of reads.

Prioritizing read commands ahead of write commands in accordance with embodiments described herein can provide benefits such as improving system latency, as compared to prior command scheduling policies, by scheduling reads ahead of writes while accounting for read-after-write dependencies, among various other benefits.

Figure 4:
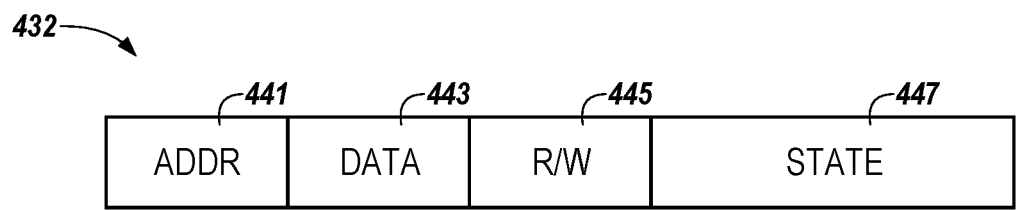
FIG. 4 illustrates an example of a command associated with implementing a command selection policy in accordance with a number of embodiments of the present disclosure.

FIG. 4 illustrates an example of a command 432 associated with implementing a command selection policy in accordance with a number of embodiments of the present disclosure. In this example, command 432 includes a number of fields 441 (ADDR), 443 (DATA), 445 (R/W), and 447 (STATE). Embodiments are not limited to a particular command structure, quantity of fields, etc. In this example, field 441 can include the row and column address of the command, field 443 can include data corresponding to the command (e.g., data to be stored in or data read from memory), field 445 can indicate a command type (e.g., whether the command is a read or write), and field 447 can indicate additional state information that may be used by a command selection policy, such as the age of the command and whether the command targets a currently open row, among other state information.

Although specific embodiments have been illustrated and described herein, those of ordinary skill in the art will appreciate that an arrangement calculated to achieve the same results can be substituted for the specific embodiments shown. This disclosure is intended to cover adaptations or variations of various embodiments of the present disclosure. It is to be understood that the above description has been made in an illustrative fashion, and not a restrictive one. Combinations of the above embodiments, and other embodiments not specifically described herein will be apparent to those of skill in the art upon reviewing the above description. The scope of the various embodiments of the present disclosure includes other applications in which the above structures and methods are used. Therefore, the scope of various embodiments of the present disclosure should be determined with reference to the appended claims, along with the full range of equivalents to which such claims are entitled.

In the foregoing Detailed Description, various features are grouped together in a single embodiment for the purpose of streamlining the disclosure. This method of disclosure is not to be interpreted as reflecting an intention that the disclosed embodiments of the present disclosure have to use more features than are expressly recited in each claim. Rather, as the following claims reflect, inventive subject matter lies in less than all features of a single disclosed embodiment. Thus, the following claims are hereby incorporated into the Detailed Description, with each claim standing on its own as a separate embodiment.

What is claimed is:

1. An apparatus, comprising:
   a memory device; and
   a controller coupled to the memory device and configured to:
      insert each of a plurality of received commands into a selected one of a plurality of prioritized queues based on a designated priority category of the respective command, wherein the designated priority category of the respective command is based on:
         a command type corresponding to the command; or
         whether the command is directed to an open row; or
         whether a read-after-write dependence is associated with the command;
         or any combination thereof; and
      select commands from the plurality of prioritized queues to issue to the memory device by iterating through the plurality of prioritized queues in order of priority; and
      wherein received column write commands and received row write commands are designated to a lower designated priority category than received column read commands and received row read commands.

2. The apparatus of claim 1, wherein the controller is configured to iterate through the plurality of prioritized queues from a priority queue having a highest priority to a priority queue having a lowest priority.

3. The apparatus of claim 2, wherein the controller is configured to insert received column read commands into the priority queue having the highest priority.

4. The apparatus of claim 3, wherein the controller is configured to insert received row read commands into a priority queue having a next to highest priority.

5. The apparatus of claim 4, wherein the controller is configured to, responsive to determining a received column write command does not have a corresponding read-after-write dependence, insert the received column write command into a priority queue having a priority lower than the next to highest priority.

6. The apparatus of claim 5, wherein the controller is configured to, responsive to determining a received row write command does not have a corresponding read-after-write dependence, insert the received row write command into the priority queue having the priority lower than the next to highest priority.

7. The apparatus of claim 1, wherein the controller is coupled to the memory device via a first interface and wherein the controller is coupled to a host via a second interface.

8. The apparatus of claim 1, wherein the apparatus is a computing system comprising one or more host processors coupled to a memory system that comprises the controller and the memory device.

9. The apparatus of claim 1, wherein the controller comprises a command queue and command selection logic configured to implement a command selection policy.

10. An apparatus, comprising:
    a memory system; and
    a controller coupled to the memory system via a first interface, wherein the controller is configured to:
       designate priority categories to respective received commands associated with transaction requests and to be issued to a memory device of the memory system;
       insert each received command into a selected one of a plurality of prioritized queues based on its designated priority category;
       insert received column read commands into a first priority queue;
       insert received row read commands into a second priority queue;
       insert received column write commands into a third priority queue responsive to determining the column write command does not have a corresponding read-after-write dependence; and
       insert received row write commands into the third priority queue responsive to determining the row write command does not have a corresponding read-after-write dependence.

11. The apparatus of claim 10, wherein the controller is configured to select commands from the plurality of prioritized queues to issue to the memory device by iterating through the plurality of prioritized queues in order of priority.

12. The apparatus of claim 10, wherein the controller is configured to designate priority categories to the respective received commands at least based on whether the command is directed to an open row.

13. The apparatus of claim 10, wherein the controller is co-located with a host comprising one or more processors.

14. The apparatus of claim 10, wherein the apparatus is a system comprising a host coupled to the controller via a second interface, the host configured to provide the transaction requests to the controller.

15. The apparatus of claim 10, wherein the controller is configured to iterate through the plurality of prioritized queues from a highest priority queue to a lowest priority queue.

16. The apparatus of claim 15, wherein the first priority queue is the highest priority queue.

17. The apparatus of claim 16, wherein the controller is configured to iterate through the plurality of prioritized queues by:
    determining whether the highest priority queue contains an issuable command by iterating through the commands in the highest priority queue, wherein the commands within each respective one of the plurality of priority queues are prioritized by an order in which they were received by the controller; and issuing an issuable command to the memory device based on determining that the highest priority queue contains the issuable command; or determining whether a next highest priority queue contains an issuable command by iterating through the commands in the next highest priority queue based on determining that the highest priority queue does not contain an issuable command.

18. A method, comprising:

determining priority categories for respective received commands;

inserting each received command into a selected one of a plurality of prioritized queues based on a determined priority category of each received command; and selecting commands to issue to a memory device by iterating through the plurality of prioritized queues in order of priority;

wherein the commands are selected to issue to the memory device based on a command selection policy in which no write commands are selected for issuance to the memory device if the prioritized queues contain any read commands, unless there exists a read command determined to have a read-after-write dependence.

19. The method of claim 18, further comprising designating received column read commands a higher priority than received row read commands.

20. The method of claim 19, further comprising:

inserting received column read commands into a highest priority queue; and inserting each received write command into one of the plurality of prioritized queues based on whether the received write command is directed to an open row or a closed row.

* * * * *